Patented Jan. 26, 1932

1,842,884

UNITED STATES PATENT OFFICE

EDWARD A. TAYLOR, OF CLEVELAND, OHIO, ASSIGNOR TO THE GRASSELLI CHEMICAL COMPANY, OF CLEVELAND, OHIO, A CORPORATION OF DELAWARE

PROCESS OF PURIFYING SULPHURIC ACID

No Drawing. Application filed August 31, 1929. Serial No. 389,879.

It is common in modern sulphuric acid practice to produce 66° Bé. Acid and acids of lower strength by diluting higher concentrated acids or oleum or by absorbing sulphuric acid anhydrid in water to obtain acid of the desired strength. The diluting of higher concentrated acids or the absorption of sulphuric acid anhydrid entails various operations in which contact of the acid with organic or carbon containing materials is hardly avoidable and it was found that very often the acid becomes discolored due to such contact. It was further found that the water available in commercial practice for this dilution or absorption is sometimes contaminated with traces of organic matter. When such water is added to strong, pure sulphuric acid a colored diluted acid is obtained and this color is often objectionable and the acid can not be used where high purity acids are required. I believe that this discoloration is due to very finely divided, or even colloidal carbon or carbonaceous material produced by the action of the strong acid upon the organic material with which it has come in contact.

My invention refers to a process of bleaching such discolored sulphuric acid and comprises reacting with a peroxide upon such acid at ordinary, or room temperature.

I have found that the discoloration of sulphuric acid produced by the contact of strong acid with organic or carbonaceous material will disappear if small amounts of hydrogen peroxide or other inorganic peroxide is added to such acid. The action of the peroxide is not instantaneous at ordinary temperature but is usually complete in about 24 hours' time unless an excess of peroxide is added, which will produce more rapid bleaching. I explain this action by the assumption that peroxide oxidizes the discoloring compounds to carbonic acid which is liberated. Amongst the inorganic peroxides which are particularly useful in the performance of my invention I mention persulphuric acid and hydrogen peroxide, the decomposition of which does not introduce foreign material into the acid. Other inorganic peroxides, perborates for instance, are equally as efficient in bleaching the acid but their use would not be desirable where it is intended to produce dilute sulphuric acid of a high degree of purity.

The amount of peroxide needed to bleach such discolored sulphuric acid is usually exceedingly small and depends upon the depth of the discoloration. A laboratory test will quickly allow the determination of the amount actually needed.

Sulphuric acid contains often traces of sulphuric dioxide which would interfere with the action of the peroxide. I therefore prefer to use the well known means of blowing air through such acid to free it from the dissolved sulphur dioxide before acting with the peroxide thereon.

Hydrogen peroxide is the best available and cheapest peroxide which I can use in my novel process and I shall illustrate my invention in the following examples in connection with the use of this peroxide, but it will be understood that other inorganc peroxides, particularly persulphuric acid, are equally as efficient and their use is embraced within the scope of my invention as claimed.

*Example 1.*—16 pounds of 3% by volume hydrogen peroxide solution were added at once with slight agitation to 35,000 pounds amber colored sulphuric acid of 65.7° Bé. and allowed to stand for 24 hours. This acid after this time was colorless and ready for use.

*Example 2.*—10 gallons of 3% by volume hydrogen peroxide were run below the surface of 140,000 pounds sulphuric acid of 65.7° Bé. which had been obtained by diluting oleum with water and which was of a brownish color; the discoloration had entirely disappeared after several hours' standing and no foreign matter could be found in the acid.

While the above examples illustrate my novel process in connection with the bleaching of 65.7° Bé. acid, it will be understood that my invention is not limited to the treatment of sulphuric acid of this particular strength, but is applicable to acids of various concentrations, especially within the range of about 60° to 66° Bé.

I claim:

1. The process of bleaching discolored sulphuric acid which is free from sulphur dioxid but contains small amounts of carbonaceous material which comprises adding hydrogen peroxide to said acid.

2. The process of bleaching discolored sulphuric acid which has been obtained by diluting sulphuric acid of high concentration with water and which has been freed from sulphur dioxid by blowing with air but contains small amounts of organic impurities which comprises reacting with hydrogen peroxide upon said acid.

3. The process of bleaching discolored sulphuric acid of a concentration between 60 and 66° Bé. which contains small amounts of carbonaceous material but is free from sulphur dioxid, which comprises adding thereto an amount of hydrogen peroxide sufficient to produce bleaching at ordinary temperature in at least about 24 hours.

In testimony whereof, I affix my signature.

EDWARD A. TAYLOR.